United States Patent
Parkin

[15] 3,699,345
[45] Oct. 17, 1972

[54] SENSING AND TRACKING APPARATUS

[72] Inventor: William J. Parkin, Natick, Mass.
[73] Assignee: Sanders Associates, Inc., Nashua, N.H.
[22] Filed: Oct. 10, 1963
[21] Appl. No.: 316,203

Related U.S. Application Data

[63] Continuation-in-part of Ser. No. 253,504, Jan. 23, 1963.

[52] U.S. Cl. ......250/203 R, 250/83.3 H, 250/211 K, 338/17, 338/18, 356/141
[51] Int. Cl. .................................................G01s 3/78
[58] Field of Search...250/203, 83.3 IR, 215; 324/57, 324/99; 244/114.5

[56] References Cited

UNITED STATES PATENTS

| | | |
|---|---|---|
| 2,437,449 | 3/1948 | Ames et al...................324/99 |
| 2,891,158 | 6/1959 | Gabar..........................324/57 |
| 3,114,859 | 12/1963 | Tolhauser et al. .........250/205 |
| 3,143,650 | 8/1964 | Mizen........................250/203 |
| 2,930,978 | 3/1960 | Yurgavtic....................324/99 |

*Primary Examiner*—Rodney D. Bennett, Jr.
*Assistant Examiner*—Daniel C. Kaufman
*Attorney*—Louis Etlinger

EXEMPLARY CLAIM

1. Sensing apparatus, comprising:
   a radiation responsive, variable impedance detector element;
   biasing means coupled to said element for providing a pair of alternating current bias signals through said element, said bias signals being in phase quadrature;
   output means coupled to said element for providing an output signal indicative of position of a remote radiation source; and
   balancing means coupled to said bias means and said output means for each said bias signal and including a variable reference voltage level to balance said quadrature and output signals with respect to said reference level at a plurality of selected rates.

7 Claims, 4 Drawing Figures

EQUIVALENT CIRCUIT

INVENTOR.
WILLIAM J. PARKIN
BY David A. Rich
ATTORNEY

INVENTOR.
WILLIAM J. PARKIN
BY David A. Rich
ATTORNEY

SENSING AND TRACKING APPARATUS

This application is a continuation-in-part of my copending application entitled, TRACKING SYSTEM, filed Jan. 23, 1963, Ser. No. 253,504.

The present invention relates to optical sensing apparatus and devices. More particularly, the invention relates to infrared sensing apparatus and devices. More especially, the invention relates to infrared detector devices for detecting the presence and location of a source of infrared radiation.

Detector elements which change electrical characteristics in response to radiation are broadly useful in the invention. Of particular use in the invention are detector elements having a variable impedance or resistivity in response to radiation. The change in impedance may be due to the well-known photoelectric effect or to energy absorption in the atomic or quantum mechanical sense.

Photoelectric devices for sensing the presence of infrared energy are broadly classified photovoltaic and photoconductive. The photovoltaic infrared detectors produce a voltage in response to the presence of infrared. The photoconductive detectors provide a variable conductivity in response to the presence of infrared energy.

Radiation absorption materials of the type used for bolometers for radiation intensity measurements epitomize an absorption-type detector. Resistive material of this character is marketed under the name thermistor by Barnes Engineering Company, Stamford, Connecticut.

Typical prior art circuits use a photoconductive infrared detector placed in series with a direct current bias source and a load impedance. The impingement of infrared energy upon the infrared detector cell has the effect of increasing its conductivity to produce a higher voltage across a load impedance. In effect, the cell and the load impedance provide a potentiometer to produce an output direct current signal which is a function of the amount of infrared energy impingent on the cell.

To provide an indication of the location of a target, prior art systems typically utilize a rotating vane or reticle which partially obscures the cell and rotates about the central axis of the cell. The system produces a null error signal when the target is precisely on boresight, that is, along the central axis of the optical cell and its associated optical system. The output voltage across the load impedance is a constant. While the center is located off the axis, the exposure of the cell to infrared energy varies with the position of the vane. In effect, the rotating vane provides a modulation which appears as an alternating current component across the load impedance. The amplitude of the modulating signal is a function of the degree of offset of the target from the boresight axis.

This prior art system is primarily a null seeking system. When the target image is displaced from the boresight axis, an error signal is produced. The error signal is an alternating signal superimposed on the direct current signal. The phase of the error signal indicates, when compared with a reference signal, the error in direction, and the amplitude, the degree of displacement or offset from the boresight axis.

Such prior art systems are subject to the disadvantages of rotating mechanical devices. These disadvantages include lack of reliability and a limitation on the possible information rate. The mechanical limitations on infrared information rate, for example, are quite important in the presence of an intermittent source of radiation.

In an article entitled, "Application of the Lateral Photoeffect to a Tracking System" by C. L. Patterson appearing in "Infrared Physics," 1962 Volume 2, pages 75–85, Porganson Press, Ltd., Great Britain, the photovoltaic detector element utilizing the so-called lateral photoelectric effect is described. Physically, this system utilizes a photovoltaic detector cell with four terminals. The system, however, is completely distinguishable from the present invention in that it utilizes the photovoltaic effect, that is, it produces an output direct current in response to the impingement of infrared energy.

A modulation signal is produced with the use of a rotating mechanical vane or reticle. The only real advantage of this system is to provide two-dimensional information in the form of a pair of orthogonal signals in the output. The circuitry, however, is enormously complicated in order to provide the desired result.

In contrast, the sensing apparatus of the present invention provides two-dimensional information without any mechanical parts, and furthermore, uses the four terminal connections to the cell to introduce a pair of alternating current bias signals in phase quadrature. This concept is completely alien to the device disclosed by Patterson.

The Patterson system is thus subject to the same inadequacies and disadvantages of the other prior art devices which require a mechanical rotating element to provide an indication of target location.

The expression "radiation responsive, variable impedance," as used herein, includes, but is not limited to, impedance changes due to electromagnetic radiation in its various forms impingent, e.g., upon a detector element. The terms thermoelectric, thermovoltaic, thermoconductive and thermosensitive, as used herein, are analogous to photoelectric, photovoltaic, photoconductive and photosensitive in that a variation in an electrical characteristic takes place in response to radiation of a thermal or optical character. Thermoconductive materials vary in impedance due to absorption of energy whatever the radiation frequency. Such materials, in the first order, vary in impedance with temperature. Since the temperature varies with radiation absorption, the impedance varies in response to radiation. While the invention is typically utilized in conjunction with optical and near optical frequencies, it will be apparent that many types of radiation are well within the scope of the invention. Examples include electromagnetic particle radiation such as atomic and sub-atomic particles.

In my copending application entitled TRACKING DEVICE, a sensing apparatus and tracking device are disclosed, involving a balancing circuit useful in that context. The present invention relates to an improvement directed to overcoming certain null shift problems inherent in the earlier system. The system in accordance with the present invention is enabled to ignore substantial and frequent ambient light changes without introducing errors due to null shift.

It is therefore a primary object of the invention to provide an improved sensing apparatus.

Another object of the invention is to provide an improved sensing apparatus characterized by a high degree of stability of operation.

Yet another object of the invention is to provide an improved sensing apparatus of the character described which responds selectively to targets or conditions of varying rate changes.

Still another object of the invention is to provide an improved sensing apparatus useful in a target tracking system.

Yet another object of the invention is to provide an improved target tracking system.

In accordance with the invention there is provided a sensing apparatus. The apparatus includes a radiation responsive, variable impedance detector element. Biasing means are coupled to the element for providing a pair of alternating current bias signals through the element. The bias signals are in phase quadrature. Output means are coupled to the element for providing an output signal indicative of the presence of a radiation source. Balancing means are coupled to the biasing means and the output means. The balancing means produce a variable reference voltage level for balancing at a plurality of selected rates the quadrature and output signals relative to the reference voltage level.

In one form of the invention the apparatus includes a primary balancing means having a variable voltage control for each of the bias signals for producing a variable reference voltage level to balance the quadrature and output signals with respect to the reference level. The primary means is coupled between the element and the biasing means for each of the bias signals. A secondary balancing means is coupled between the output means and the biasing means to the variable voltage control to balance the quadrature and output signals with respect to the reference level at a rate slower than the primary means.

Other and further objects of the invention will be apparent from the following description of the invention taken in connection with the accompanying drawings, and its scope will be pointed out in the appended claims.

PRINCIPLES OF OPERATION

Figure 1:
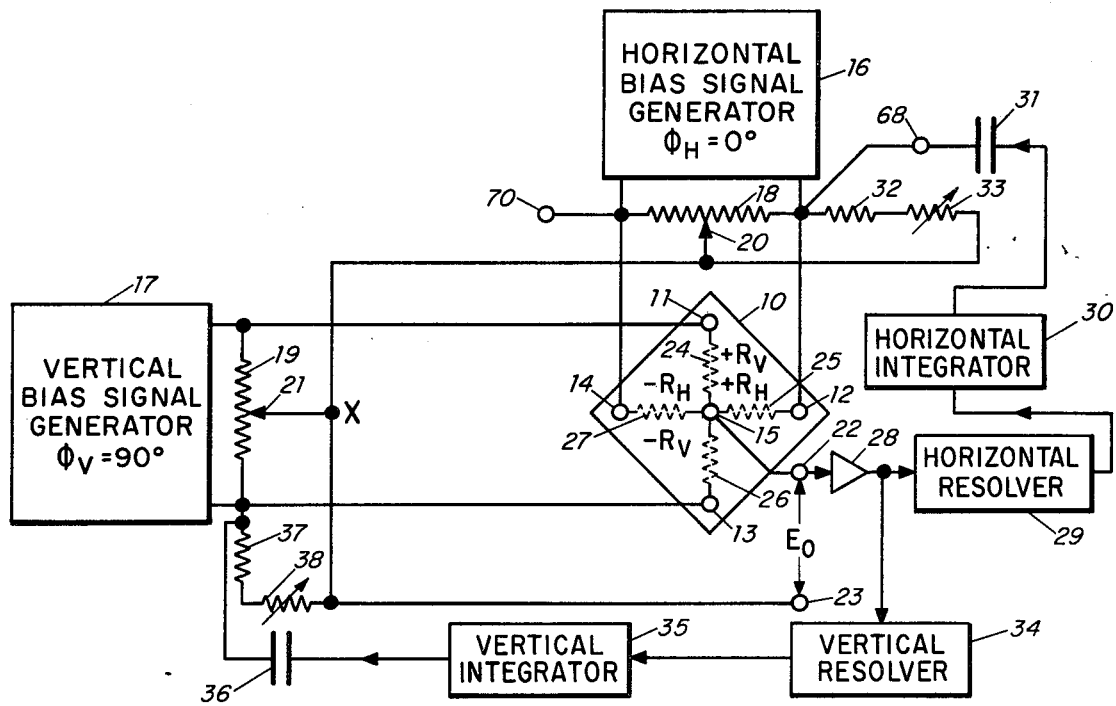
FIG. 1 is a schematic circuit diagram of a sensing apparatus illustrating the principles of the invention.

In the conventional detection circuit, a photoconductive detector element, for example, a lead sulphide cell, forms part of a voltage divider. Modulated light impinging on the cell produces an electrical output. The voltage gradient across such a cell is linear and the equipotential lines, i.e., lines of equal voltages, are perpendicular to the direction of the current flow.

The sensing apparatus of the present invention as distinguished from the prior art provides in effect a rotating field detector. This result is obtained by introducing a pair of alternating current bias signals which are phased in quadrature. By employing a cell having four ohmic terminals connected to the cell in a rhombic pattern, opposing pairs of terminals provide orthogonal axes. With an ohmic terminal disposed at the center of the rhombic pattern, an alternating signal applied to a pair of diagonally opposed colinear terminals produces zero output unless an impedance unbalance occurs between the central terminal and one of the opposed bias terminals. This result in effect produces an output error signal the amplitude of which provides the necessary information to determine the degree of offset or displacement of a source of radiation from the boresight or central axis of the cell. This, of course, is true for one of a pair of orthogonal axes. By introducing another alternating current across an axis physically orthogonal to the first axis as defined by the terminals, the information may be obtained for the other of a pair of orthogonal reference axes.

The effect of introducing a pair of quadrature phased bias alternating current signals to such a cell is to produce a rotating field. Because of the rotating field, a target image off the reference axes produces an error signal which varies in phase as well as amplitude. This phase variation enables the resolution from the resultant output error signal of orthogonal signal components, e.g., vertical and horizontal or azimuth and elevation.

The detector circuit of the copending application is indeed subject to drift or null shift. While the balance circuit of that system could be adjusted to balance a detector element at a given time, changes in conditions which effect the element contribute to further null shift. In accordance with the principles of the present invention an automatic balancing circuit is inserted which maintains the circuit balanced at all times. By introducing, for example, a relatively slow, integrating circuit, the output signal may be fed back to the balance circuit to correct it for ambient conditions. The automatic balance circuit may be then switched to remove the output signal feedback link in order to avoid efforts of the system to compensate for apparent null shift due to the presence of a relatively fast moving target.

Quadrature biased signal circuits are coupled between the output and the bias source. The output signal is amplified and separated into horizontal and vertical resolver and integrator channels respectively to couple a varying balancing signal to the bias circuits.

DESCRIPTION AND EXPLANATION OF THE SENSING CIRCUIT IN FIGS. 1 AND 2

Referring now to the drawings and with particular reference to FIG. 1, there is here illustrated a schematic circuit diagram of a sensing apparatus illustrating the principles of the invention. Here a radiation responsive, variable impedance detector element, such as a photoconductive or thermoconductive element, provides the basic sensing element for the circuit. The element is shown coupled to a pair of quadrature phased bias signal generators. Balancing means potentiometers are coupled in parallel with the bias generators.

Thus a photoconductive detector element 10 having four input ohmic bias terminals 11, 12, 13, and 14 disposed in a square, or more generally a rhombic, pattern and a centrally disposed, output ohmic terminal 15 provides the basic sensing element. Biasing means, here designated as a horizontal bias signal generator 16 and vertical bias signal generator 17, are each coupled to a pair of diametrically opposed input bias terminals. The generator 16 couples a reference or 0° phase bias signal to the diagonally opposed input bias terminals 12 and 14 of the element 10. The generator 17 couples a quadrature or 90° phase bias signal to the other two input bias terminals 11 and 13. The bias signals are thus in phase quadrature.

A balancing means, here shown including potentiometer stators 18 and 19, are coupled respectively between the biasing means generators 16 and 17 and the element 10. The potentiometers or variable resistors have variable electrical connections 20 and 21 coupled respectively to the stators 18 and 19. The variable connections are joined at a junction indicated as X. An output signal $E_o$ appears between the terminals 22 and 23. The terminal 22 is connected directly to the output terminal 15 of the element 10 and the terminal 23 is connected to the junction point X. The balancing means are thus coupled to the bias means between the element and the bias means for each of the bias signals. The balance means include a variable voltage control for producing a variable reference voltage level to balance the quadrature and output signals with respect to the reference level. The internal equivalent resistance of the detector element or photocell is indicated in dashed lines by the phantom lumped constant resistors 24, 25, 26, and 27 connected between the element output terminal 15 and the input bias terminals 11, 12, 13, and 14, respectively. The resistors 24, 25, 26, and 27 are also indicated as $+R_V$, $+R_H$, $-R_V$, and $-R_H$, respectively. The phantom resistors are helpful in describing a physical pair of orthogonal reference axes with respect to which the position of a point of received energy may be indicated.

The output signal is coupled from the terminal 22 to an amplifier 28. The output of the amplifier is coupled to a horizontal resolver 29. The output of the resolver 29 is coupled through a horizontal integrator 30 and through a capacitor 31 to the terminal 12 providing a junction with the potentiometer stator 18. Between the junction with the terminal 12 and the variable connection 20 are connected a pair of resistors 32 and 33. The resistor 33 is variable, as shown.

Another output of the amplifier 28 is coupled through a vertical resolver circuit 34 and vertical integrator circuit 35 and a capacitor 36 to a pair of resistors 37 and 38. The resistor 38 is variable as shown. The resistors 37 and 38 are connected in parallel with one-half of the stator 19.

Figure 2:
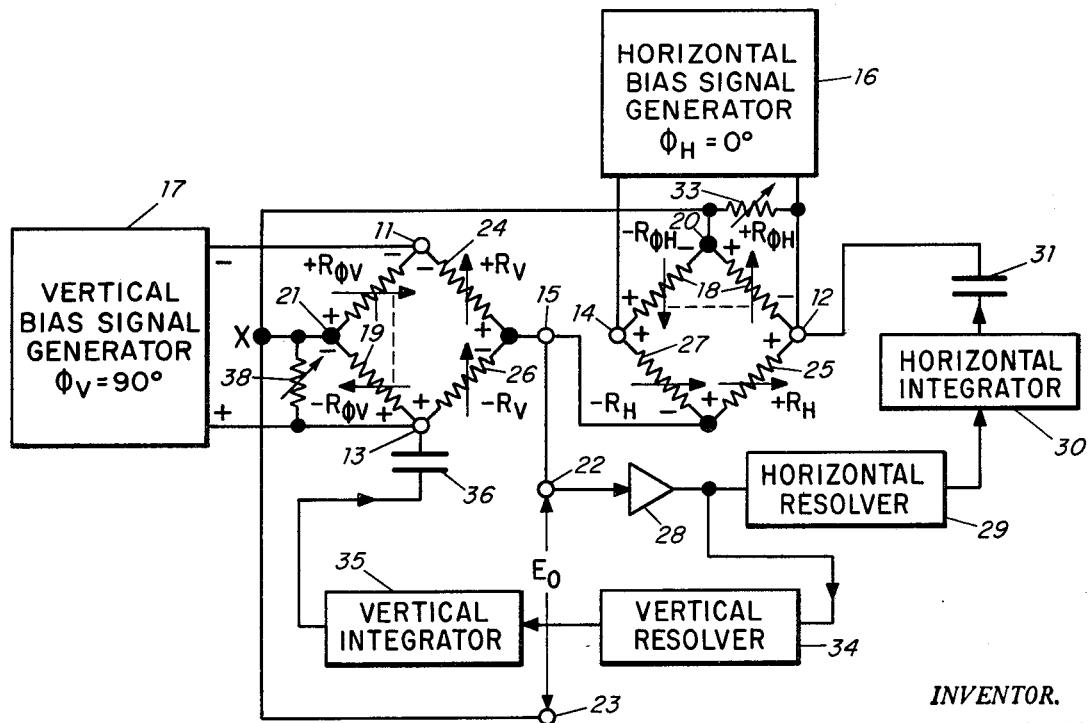
FIG. 2 is an equivalent circuit of the circuit in FIG. 1.

Referring now to FIG. 2, the equivalent circuit of the circuit in FIG. 1 is illustrated. Like elements in FIG. 2 have the same reference numerals as in FIG. 1. The following discussion is with reference to the vertical circuits in both FIGS. 1 and 2. The circuit, as shown, is presented as a pair of bridge circuits illustrating the independence of control or adjustment of the vertical and horizontal circuits relative to a reference voltage level. Voltage polarities shown are for a given instantaneous condition.

The potentiometer stators are shown with the elements $+R_{-\Phi}$ variable in an inversely coupled manner to correspond with the variation in resistance attributable to motion of the variable electrical connections 20 and 21. The resistors marked $+R_{-V}$ and $+R_{-H}$ are equivalent lumped constant resistors which vary in accordance with impingent radiant energy.

With no optical signal impingement on the photocell 10, that is, under dark current conditions, the output signal $E_o$ between the terminals 22 and 23 can be any predetermined amount. The signal represented by $E_o$ is a composite signal which includes both horizontal and vertical information, or, more generally, orthogonally resolvable phase components. In the simplest case the variable potentiometer electrical connection 21 can be varied in order to balance the vertical bias signal and output signal $E_O$ relative to the reference voltage level at the point X to produce, for example, zero vertical voltage output between the terminals 22 and 23. Similarly, the variable connection 20 may be adjusted to produce a zero horizontal voltage output. In this manner the quadrature and output signals are balanced relative to the reference voltage level at the point X. Note that with respect to the point X the reference or horizontal bias signal can be adjusted independently from the quadrature or vertical bias signal.

It will be apparent that the dark current condition corresponds with uniform light applied throughout the cell. The circuit as illustrated responds to an unbalance signal of some kind in order to produce an output signal. The balance condition described above is determined for the purpose of producing an output signal in response to an unbalance of an impingent optical signal. A spot of light falling on the boresight axis illuminates the surrounding area uniformly and symmetrically to produce no unbalance. A spot of light falling between the terminals 15 and 11 along the vertical axis has the effect of reducing the resistance $+R_V$ to produce unbalance since the resistance $-R_V$ is unaffected.

Assume an input voltage, for example, of 100 volts appearing between the terminals 11 and 13, then the voltage potentials for a balanced condition will be equal and opposite for the circuit taken with respect to the terminals 22 and 23. For the balanced condition the potential across each resistor is 50 volts. Starting with the terminal 22, the voltage across the resistor $+R_V$ is equal and opposite to the voltage across the resistor $+R_{\Phi V}$. Similarly the voltage across the resistor $-R_V$ is equal and opposite to that across the resistor $-R_{\Phi V}$.

Now consider an unbalance between the bias voltages appearing across the resistors $\pm R_{\Phi V}$ for example, a voltage across $+R_{\Phi V}$ of 10 volts. Then the voltage across $-R_{\Phi V}$ is 90 volts. Starting from terminal 22 the voltage across $+R_V$ is +50 volts added to the negative 10 volts across $+R_{\Phi V}$ to produce an output voltage of +40 volts. Going the other way from the terminal 22 the voltage across $-R_V$ is −50 volts in series with the +90 volts across $-R_{\Phi V}$ to produce again +40 volts. Note that the reference voltage level in this condition may be taken to be 40 volts. If the resistance $\pm R_V$ were internally unbalanced correspondingly in the same proportion, 10 volts would appear across $R_V$ and 90 volts across $-R_V$ to produce an output signal $E_O$ of 0 volts for no signal condition.

For the condition in which the voltages across $\pm R_V$ are balanced, light impinging in the region between the terminal 15 and the terminal 11 along the vertical axis tends to decrease the resistance $+R_V$. Assuming that the voltage across the resistor $+R_V$ is −40 volts and across the resistor $-R_V$ is $-60$ volts, the output signal voltage at the terminals 22 and 23 becomes 10 volts. It may be seen that the vertical signal component in the output signal $E_o$ is a function of the variation in impedance of $\pm R_V$ in response to radiant energy.

The resultant 10 volt output signal for an unbalance of 10 volts across $\pm R_V$ with $\pm R_{\Phi V}$ balanced, may be determined by adding the voltages in a similar manner. The $+40$ volts across $+R_V$ and the $-50$ volts across $R_{\Phi V}$ yield $-10$ volts output; the $-60$ volts across $-R_V$ and the $+50$ volts across $-R_{\Phi V}$ yield again $-10$ volts.

Noting that the output signal $E_o$ is indeed a composite signal including both the vertical and horizontal components, the above analysis is equally appropriate to the circuit associated with the reference or horizontal bias signal generator 16. Once the system is balanced as, for example, by a predetermined setting, the output signal is a function of the unbalance impedance, e.g., due to the displacement of a light spot off the origin. Note that in the region between, but not including, the terminals 15 and 11 a light spot of given intensity may move up and down the axis and vary the output signal in accordance with the sensitivity curve of a given cell configuration. The circuit responds also to a variation of intensity at a given point. For a given intensity the output signal amplitude responds in accordance with displacement from the origin.

In the event of an unbalance in the system such as to provide a voltage output between the terminals 15 and 21 with, for example, a positive 10 volts at the terminal 15 the system compensates to overcome this voltage. The positive 10 volts is fed through the amplifier 28 and the vertical resolver 34, vertical integrator 35, and capacitor 36 to the terminal 13. A negative feedback voltage across $-R_{\Phi V}$ exactly corresponds with the original positive unbalance to provide zero volts between the terminal 15 and the terminal 21. The horizontal system responds in a similar manner to an unbalance or drift shift in the horizontal axis.

DESCRIPTION AND EXPLANATION OF THE TRACKING SYSTEM IN FIG. 3.

Figure 3:
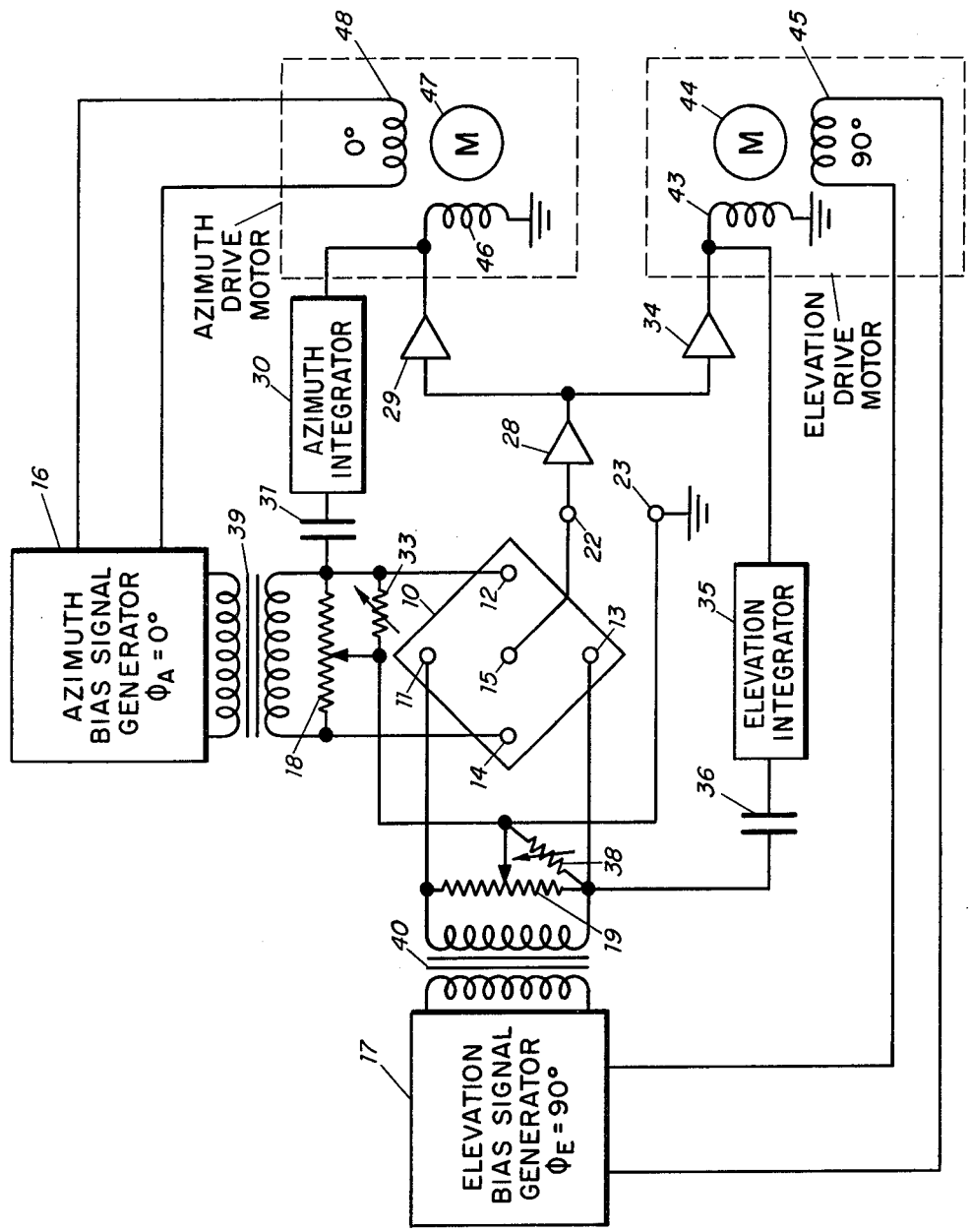
FIG. 3 is a schematic circuit diagram of a target tracking system embodying the invention.

Referring to FIG. 3, there is here illustrated a schematic circuit diagram of a target tracking apparatus. The tracking apparatus includes a mounting means including a movable member with two degrees of freedom to carry the cell and its associated optical equipment. For purposes of clarity, the mount means and the movable member are not shown. Here again the element carries four input bias terminals arranged, for example, in a rhombic pattern and an output terminal centrally disposed with respect to the pattern. Biasing means are coupled to the element through the input terminals for providing a pair of alternating current bias signals through the element. The bias signals are in phase quadrature. Output means are coupled to the element through the output terminals for providing vertical and horizontal drive control signals indicative of position of a remote radiation source relative, for example, to the boresight axis of the element. Primary balancing means are coupled to the biasing means between the biasing means and the element for balancing the quadrature signals and provide a null reference. Secondary balancing means are coupled between the output means and the primary balancing means for balancing the quadrature and output signals with reference to the reference level at a slower rate than the primary balancing means. Drive means are coupled to the output means for controlling the orientation of the movable member in response to the drive control signals.

Thus, in FIG. 3, a photoconductive element 10 has its input terminals 11, 12, 13, and 14 and the output terminal 15 connected to a pair of bias transformers 39 and 40.

The source of phase $\phi_A$ bias signal is derived from the azimuth or horizontal bias signal generator 16 and the phase $\phi_E$ from the elevation or vertical bias signal generator 17. The phase bias signals are coupled as shown to the primaries of the transformers 16 and 17. The secondary windings of the transformers 16 and 17 are connected to the respective terminal pairs 12, 14, and 11, 13. The output is coupled from the output terminal 15 to the input of the amplifier 28.

The output of the amplifier 28 is coupled to the elevation amplifier and vertical resolver 34 and, in parallel, to the azimuth amplifier 29. The output of the amplifier 34 is coupled to a control winding 43 of an elevation drive motor 44. A reference winding 45 of the motor 44 is coupled back to the elevation generator 17. The output of the amplifier 29 is coupled to a control winding 46 of an azimuth drive motor 47. The reference winding 48 of the motor 47 is coupled back to the azimuth generator 16.

The balancing potentiometers 18 and 19 are coupled in parallel respectively with the secondary windings of the transformers 39 and 40. The variable potentiometer electrical connections are at ground potential. The variable potentiometer electrical connections are electrically connected together and the output signal appears at the output terminal 15 with respect to a reference ground voltage potential.

The output of the amplifier 29 is coupled to the azimuth or horizontal integrator 30 and capacitor 31 to the resistor 33. The output of the amplifier 34 is coupled to the elevation or vertical integrator 35, capacitor 36 to the resistor 38.

In the system, as described, the detector element 10 is mounted on a movable member which is controlled in orientation by the drive motors 44 and 47. When light is impingent upon the cell 10 off its central axis, an output signal is produced which is amplified at the amplifier 28 and applied through the elevation amplifier 34 and azimuth amplifier 29 to the control windings of the motors 44 and 47. The motors are preferably dual phase induction motors. They operate on the principle of providing maximum rotation in a given direction when the phase of the energy on the control winding is 90° out of phase with the energy on the reference winding. Speed of rotation is a function of both the phase difference between the drive control signal on the control winding and the amplitude of the drive control signal. The direction of rotation is a function of the phase difference as well. For example, when the phase difference is $-90°$, the motor rotates in one direction and when the phase difference is $+90°$, the motor rotates in the opposite direction.

The indicated phase of each reference winding 45 and and 48 of the motors 44 and 47 is 0° and 90°, respectively. Since the phase of each control winding, for maximum torque for a given amplitude, must be at quadrature with its corresponding reference winding, a variable phase control is provided in the amplifiers 29 and 34.

The feedback system for each of the azimuth and elevation circuits is introduced between the output of the amplifier 28 and the corresponding balancing transformer. When the system is subjected to a slowly varying ambient condition, such as slowly varying temperature, humidity and pressure conditions, tending to unbalance the element 10, the feedback system, as indicated above, operates to compensate for the change. Primary balancing of the system is obtained by first adjusting the potentiometer 18 for azimuth and potentiometer 19 for elevation. Secondary balancing of the slowly varying ambient conditions is obtained by virtue of the operation of the feedback system. The secondary balancing is obtained by adjusting the resistor 33 for azimuth and 38 for elevation. The feedback system operates automatically to compensate for any slow changes. It is important to differentiate between slow and fast impedance changes in the element in order to avoid interference with the system's target tracking ability.

When an error signal is applied to the control windings, a correction is made by the elevation drive motor with respect to $\phi_E$ and the azimuth drive motor with respect to $\phi_A$ to reorient the cell along the boresight axis with respect to a source of radiation. This target tracking system is thus a null-seeking system.

DESCRIPTION AND EXPLANATION OF THE CIRCUIT IN FIG. 4

Figure 4:
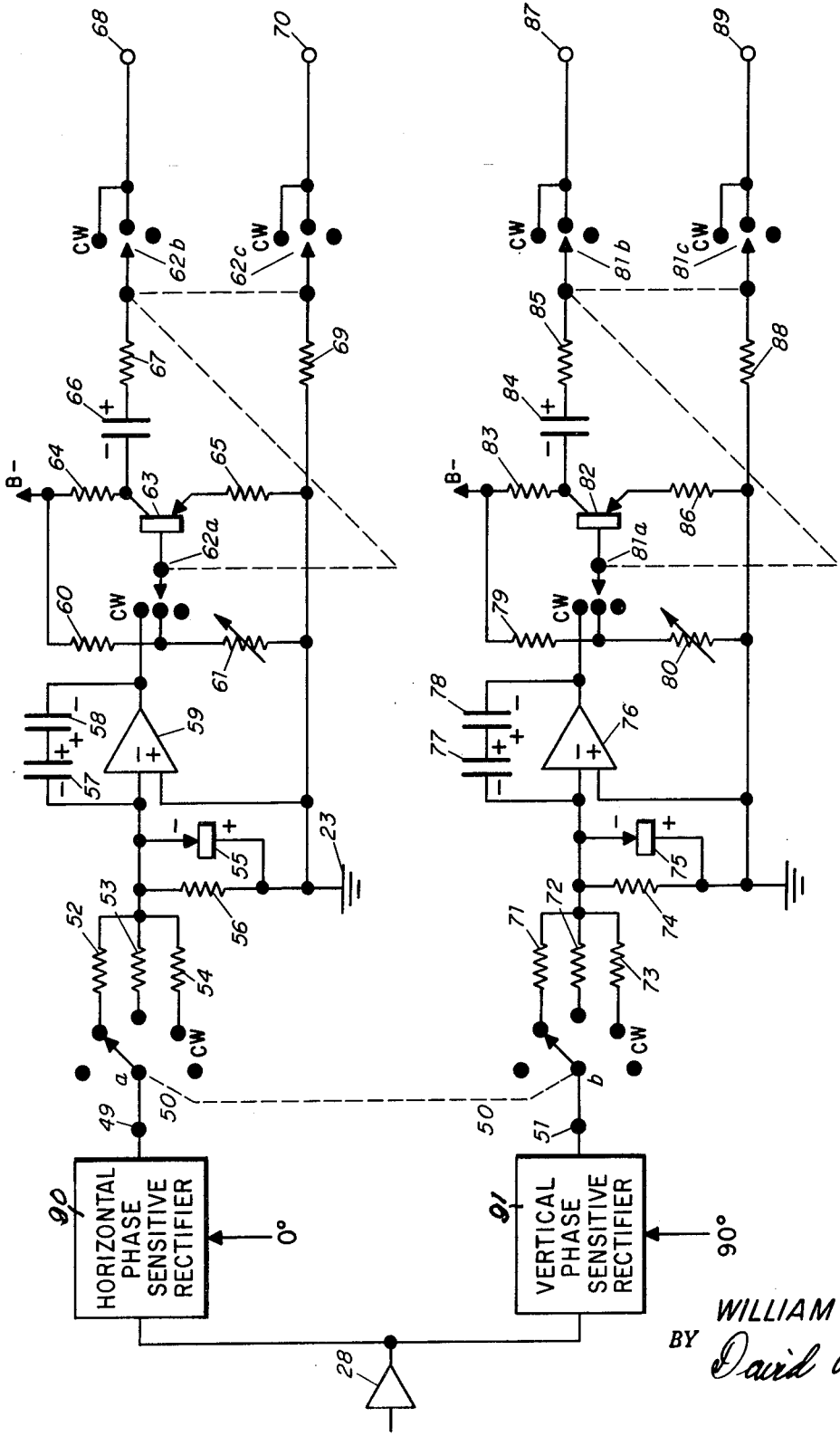
FIG. 4 is a detailed schematic diagram of a balancing circuit useful in the apparatus of FIGS. 1, 2, and 3.

Referring to FIG. 4, there is here illustrated the detailed schematic circuit diagram of the balancing circuit useful in the circuit of FIG. 1.

The output of the amplifier 28 as shown in FIG. 1 is here coupled to a horizontal phase sensitive rectifier 90 and, in parallel, to a vertical phase sensitive rectifier 91. The rectifiers 90 and 91 operate to produce an output direct voltage in response to the difference in phase between a pair of input alternating current signals. Rectifier 90 operates to resolve the horizontal signal component and the rectifier 91 operates to resolve the vertical signal component. The rectifier 90 derives an input reference 0° signal from the horizontal bias signal generator 16 in FIG. 1; the vertical rectifier 91 derives a reference 90° signal from the vertical generator 17 in FIG. 1. The outputs of the rectifiers are applied to input terminals 49 and 51 respectively.

As indicated, ground potential in FIG. 4 corresponds with terminal 23 in FIG. 1. The output of the horizontal feedback circuit is taken through the terminals 68 and 70 which are shown in FIG. 1; the vertical output is through terminals 87 and 89 which are shown in FIG. 1.

The output of the vertical rectifier is coupled through the terminal 49 through a two gang switch section 50a to a group of parallel resistors 52, 53 and 54. A limiting diode is coupled in parallel with a load resistor 56. The output is coupled through an amplifier 59 to a stator contact of a three position rotary switch 52. A pair of resistors 60 and 61 are connected in series between ground and a source of negative voltage. A transistor has its emitter connected through a grounded bias resistor 65 and its collector through a load resistor 64 to the negative voltage source. The base is connected to the arm of a switch section 62a. The letters CW indicate clockwise motion of the switch arm. The collector is coupled through a capacitor 66 and resistor 67 to the rotary contact of a switch section 62b. Two stator contacts of the switch 62b are connected to an output terminal 68 and the third is empty. A third section of the switch 62c has its rotary member connected through a resistor 69 to ground. Two of the contacts are connected to an output terminal 70 and the other one is discontinued.

The output of the vertical rectifier 91 is coupled through the terminal 51 and the switch section 50b to one of three resistors 71, 72, 73 connected in parallel. The resistors are connected through a load resistor 74 to ground. In parallel with the resistor 74 is a limiting diode 75. The output of the resistor 74 is coupled to an amplifier 76. In parallel with the amplifier 76 are a pair of series connected bypass capacitors 76 and 78. The output of the amplifier is connected to a stator contact of the three-section switch 81a. A second stator connection is connected to a junction between a pair of series resistors 79 and 80 which are connected between ground and the negative voltage source. The rotary member of the switch section 81a is connected to the base of a transistor 82. The collector is connected through a resistor 83 to the negative source and the emitter through a resistor 86 to the ground. The output of the transistor 82 is coupled through a capacitor 84 and resistor 85 to the switch section 81b which is coupled through to an output terminal 87. A third section of the switch 81c has its rotary member coupled through a resistor 88 to ground and its stator connections through an output terminal 89.

Referring to the azimuth or horizontal feedback system extending between the terminal 49 and the output terminals 68 and 70, the response time of the feedback circuit is determined by the switch 50a. Rotated in a clockwise direction from the resistor 52 to the resistor 54, the response time decreases. When the system is balanced the switch may be turned to one of the "off" positions to prevent further adjustment of the apparent null position. The rectifier 55 bypassing the resistor 56 operates as a limiting diode. For any voltage high enough with respect to ground to cause the diode to conduct, the resistor 56 is shorted out and the signal is essentially grounded. Below that level the signal voltage cannot exceed the voltage necessary to cause the diode 55 to conduct. The circuit 59 is an integrating amplifier when taken in combination with the capacitors 57 and 58. The switch 52a controls the automatic manual or "off" positions for the feedback circuit. When the switch is rotated in a clockwise direction the positions are off, manual, and automatic, respectively. The switch rotor is coupled to the base of the transistor 63 which is connected as a variable impedance device. This variable impedance is connected in parallel with a part of the detector element and functions in place, e.g., of the variable resistor 33 in FIG. 1. The output signal is coupled through the capacitor 66 and resistor 67 through the switch section 62b back to the balancing circuit as shown for example in FIG. 2.

The circuit extending between the terminal 51 and 87 and 89 is used for the elevation or vertical feedback loop. The two systems operate similarly hence the analysis of the system described above applies to the elevation system.

It will be apparent from the foregoing description and discussion that the present invention greatly enhances the stability of operation of prior art sensing and tracking apparatus. The invention has broad application to the arts of measurement and control wherever a high degree of stability is required.

While there has hereinbefore been presented what at present are considered to be the preferred embodiments, it will be apparent to those of ordinary skill in the art that many modifications and changes may be thereto made without departing from the true spirit and scope of the invention.

It will be considered, therefore, that all those changes and modifications which fall fairly within the scope of the invention shall be a part of the invention.

What is claimed is:

1. Sensing apparatus, comprising:
a radiation responsive, variable impedance detector element;
biasing means coupled to said element for providing a pair of alternating current bias signals through said element, said bias signals being in phase quadrature;
output means coupled to said element for providing an output signal indicative of position of a remote radiation source; and
balancing means coupled to said bias means and said output means for each said bias signal and including a variable reference voltage level to balance said quadrature and output signals with respect to said reference level at a plurality of selected rates.

2. Sensing apparatus, comprising:
a radiation responsive, variable impedance detector element;
biasing means coupled to said element for providing a pair of alternating current bias signals through said element, said bias signals being in phase quadrature;
output means coupled to said element for providing an output signal indicative of position of a remote radiation source;
primary balancing means coupled to said bias means between said element and said biasing means for each said bias signal and including a variable reference voltage level to balance said quadrature and output signals with respect to said reference level; and
secondary balancing means coupled between said output means and said primary balancing means to said variable voltage control for balancing said quadrature and output signals with respect to said reference level at a slower rate than said primary balancing means.

3. The sensing apparatus of claim 1, wherein:
said balancing means has a feedback means, including integrator means, coupling said element, said bias means, and said output means.

4. The sensing apparatus of claim 3, wherein:
said detector element includes a bridge circuit; and
said balancing means includes primary balancing means coupled between said bias means and said element for initially balancing said bias and output signals with respect to said reference level to provide a null signal output when no received signal is present, said feedback means providing a feedback signal for further balancing said bias and output signals only in response to relatively slowly varying signals while passing relatively fast signals.

5. The sensing apparatus of claim 3, wherein:
said feedback means includes a horizontal resolver, a horizontal integrator, a vertical resolver and a vertical integrator to enable said output means to provide an output signal indicative of position of the source of a received signal.

6. The sensing apparatus of claim 3, wherein:
said feedback means includes a vertical signal channel having an operational amplifier and a horizontal signal channel having an operational amplifier.

7. The sensing apparatus of claim 1, wherein:
said output means includes vertical and horizontal drive means for positioning said detector element in accordance with the position of a source of received signals.

* * * * *